United States Patent [19]
Thorman et al.

[11] Patent Number: 5,634,325
[45] Date of Patent: Jun. 3, 1997

[54] SPIRAL GROOVED ROLLER MECHANISM

[75] Inventors: Christopher S. Thorman, Beaver Dam; Richard D. Thier, Juneau; Phillip O. Swenson, Beaver Dam, all of Wis.

[73] Assignee: Deere & Company, Moline, Ill.

[21] Appl. No.: 448,926

[22] Filed: May 25, 1995

[51] Int. Cl.$^6$ ................................................ A01D 34/62
[52] U.S. Cl. .................................................... 56/7; 56/249
[58] Field of Search ............................... 56/7, 249, 294, 56/249.5, 252

[56] References Cited

U.S. PATENT DOCUMENTS

| | | |
|---|---|---|
| 2,471,975 | 5/1949 | Packwood . |
| 4,021,996 | 5/1977 | Nolan et al. ............................... 56/249 |
| 4,516,388 | 5/1985 | Chandler ................................... 56/249 |
| 5,394,681 | 3/1995 | Bartlett et al. ................................. 56/7 |

OTHER PUBLICATIONS

Bunton, sales brochure title unknown, one (1) page, dated Jan. 1993, published in the U.S.A.

Jacobson, sales brochure title unknown, 1 (one) page, dated Jan. 1993, published in the U.S.A.

Deere & Company, sales brochure entitled "3365 Professional Turf Mower", four (4) pages, dated Jan. 1992, published in the U.S.A.

Deere & Company, sales brochure entitled "2653 Professional Utility Mower", dated Jan. 1993, four (4) pages, published in the U.S.A.

Deere & Company, sales brochure entitled "Walk-Behind Green Mowers", four (4) pages, dated Jan. 1992, published in the U.S.A.

The Toro Company, sales brochure for a Toro Greenmaster mowing machine, two (2) pages, dated 1993, published in the U.S.A.

The Toro Company, sales brochure entitled "The New Toro Grooming Reel for the Riding Greensmaster", one (1) page, dated Feb. 1989, published in the U.S.A.

*Primary Examiner*—Terry Lee Melius

[57] ABSTRACT

A roller mechanism for a reel mower cutting unit, wherein the roller includes a spiral member fixed with a central tube member. The spiral member includes a radially outer edge portion which rolls in contact with the ground during operation.

13 Claims, 3 Drawing Sheets

SPIRAL GROOVED ROLLER MECHANISM

BACKGROUND OF THE INVENTION

This invention relates to rollers which support reel mower cutting units above the ground.

Reel mower cutting units of conventional design include a cylindrical cutting reel having a plurality of cutting blades extending in spiral or helical patterns around the reel's axis of rotation. These cutting blades rotate in close proximity to a laterally extending bed knife for cutting vegetation with a shearing action. Reel mower cutting units include a frame within which the cutting reel and bedknife are supported. Conventional reel mower cutting units include front and rear rollers which roll in contact with the ground for supporting the cutting unit during operation. The rollers are vertically adjustable for establishing the height at which vegetation is cut by the reel and bedknife. This type of conventional reel mower provides a very accurate and precise cutting of grass. Reel mowers are therefore typically used in highly manicured areas where precision turf mowing is necessary, such as golf courses.

Many such conventional cutting units provide rollers having a cylindrical shape and a smooth continuous surface. The smooth outer surface of the roller rolls in contact with the ground during mowing operations. As the roller encounters debris such as clumps of grass, sand or dirt, the roller will rise up to ride over the obstruction, thereby affecting the height at which grass is cut. Even small obstructions or debris which lie in the path of the smooth rollers tends to negatively affect the cut quality. Furthermore, debris such as grass clippings, sand or dirt tends to accumulate on the outer surface of the smooth roller, which increases the effective diameter of the smooth roller. This causes the reel and bedknife to ride higher above the ground, thereby altering the cutting height. It is known to provide roller scrapers which wipe or scrape the debris from the surface of the smooth roller. These roller scraper mechanisms add cost, complexity and weight to the cutting unit. Furthermore, the roller scrapers are positioned in a crowded or cramped space within the cutting unit frame between the roller and cutting reel. Therefore, to provide room for the roller scraper the roller must be sufficiently spaced from the cutting reel. When the roller is spaced a large distance from the cutting reel the cutting unit has a larger effective wheel base and the reel and bedknife positioned between the rollers are less able to accurately follow small undulations in the ground contour. Cut quality is thereby negatively affected. This type of smooth surfaced roller has the further disadvantage of pressing down the grass to be mowed, which negatively affects cut quality.

A second type of cutting unit roller is the grooved roller. Grooved rollers provide a tube on which a plurality of washers and spacers are stacked. The spacers are positioned between adjacent washers to provide a space or groove therebetween. The washers have a larger diameter than the spacers, and therefore the outer radial edge of the washers contacts the ground surface during operation. The washers rolling in contact with the turf to be mowed cause some blades of grass to stand upright or erect, which makes it easier for the cutting reel to cut the grass and thereby helps improve cut quality. The washers are typically not manufactured to a high tolerance, so the washers may have somewhat different effective diameters. This may result in the roller having a non-uniform diameter which might cause the cutting unit to mow the grass at different heights as the cutting unit rolls across the ground. The low manufacturing tolerances of the various parts allows the grooved roller assembly to be manufactured relatively inexpensively, but cut quality can be negatively affected by the low manufacturing tolerances.

As the grooved roller encounters an obstruction such as a small clump of grass, dirt or sand, the obstruction can pass on either side of the washer and through the space provided by the spacer. Therefore, small obstructions or debris in the path of the roller do not significantly affect the cutting height when grooved rollers of this type are utilized. Furthermore, unlike smooth rollers, grooved rollers do not provide a large ground engaging surface on which debris can accumulate. The debris does not tend to accumulate on the outer edges of the washers which contact the ground during operation. Rather, the debris tends to accumulate in the space between adjacent washers, and on the vertical side surfaces of the washers. Minor accumulation of debris on the sides of the washers generally does not affect the cutting height or cut quality of the cutting unit. Nevertheless, grooved rollers have been provided with a scraper mechanism or comb apparatus which is biased against the grooved roller for scraping or wiping debris from between the washers. Debris is thereby prevented from accumulating between the washers to such a large extent that the roller's effective diameter is increased and cut quality is affected. The scrapers insure that the roller's effective diameter remains unchanged during operation. Comb type scrapers add cost, complexity and weight to the cutting unit.

Grooved rollers are typically coupled to the front of the cutting unit, and a smooth roller is typically coupled to the rear portion of the cutting unit. The smooth rear roller serves to smooth out or flatten the surface of the ground after the cutting unit has passed over it. However, the washers of the grooved roller tend to create impressions in the ground surface over which the grooved roller passes. The smooth roller at the rear of the cutting unit is typically incapable of smoothing out all traces of the impressions caused by the grooved roller. Conventional grooved rollers therefore may leave unsightly marks or indentations in a smooth ground surface such as a golf course green even when a smooth roller is provided at the rear of the cutting unit.

Soil compaction can hinder turf growth and is therefore a major concern of golf course superintendents. The many washers and spacers which must be positioned on the tube of a conventional grooved roller in order to span the entire width of the cutting unit add a relatively large amount of weight to the cutting unit. The heavy weight undesirably contributes to soil compaction beneath the cutting unit during operation.

Another type of roller is a machined grooved roller. Instead of having washers and spacers which are stacked on a tube, a machined grooved roller is manufactured by machining grooves in an otherwise generally solid roller. Vertically extending portions remain between the machined grooves. The vertically extending portions roll in contact with the ground much like the outer edges of the washers of a grooved roller having stacked washers and spacers. Machined grooved rollers have the advantage of being readily manufacturable with a very tight tolerance, which helps establish a uniform effective roller diameter. The uniform diameter allows the cutting unit to operate at a constant cutting height, which generally results in improved cut quality. However, the machining process is relatively expensive. Furthermore, machined grooved rollers are typically relatively heavy, and therefore negatively contribute to soil compaction.

It would therefore be desirable to provide a reel mower cutting unit with a roller that is light weight so that soil compaction is minimized. It would also be desirable for the roller to ride across small obstructions such as clumps of grass, dirt or sand without adversely affecting the height of cut or the cut quality. It would be desirable for such a roller to generally hinder or prevent the accumulation of this debris on the roller without requiring a heavy or bulky roller scraper.

SUMMARY OF THE INVENTION

The preferred embodiment of the present invention provides a roller having spiral members which extend helically around a tube. The spiral members include an outer edge portion which rolls in contact with the ground during forward travel. The roller can be adjusted vertically with respect to the cutting unit frame for changing the height at which grass is cut by the cutting reel and bedknife. As the spiral roller encounters small obstructions such as clumps of grass and dirt, the obstructions will be directed into the spaces defined between the spiral members, thereby maintaining the roller in firm contact with the ground such that the cutting height and cut quality are not affected. The debris which is directed to the gaps between the spiral members is generally cleared from the vertically extending side portions of the spiral member as the outer edge portion rolls in contact with the ground. The spiral roller according to the preferred embodiment of the present invention is generally self-cleaning, thereby eliminating the need for a roller scraper mechanism. The absence of a scraper decreases the manufacturing cost of the cutting unit, simplifies the entire structure, and reduces the weight of the cutting unit. The spiral roller according to the present invention is relatively light in comparison to conventional grooved rollers with stacked washers and spacers. The relatively light weight of the spiral roller helps minimize ground compaction. The spiral roller also tends to leave relatively few marks or impressions on the surface of the turf when a smooth roller is mounted to the rear of the cutting unit.

DESCRIPTION OF THE PREFERRED EMBODIMENT

Figure 1:
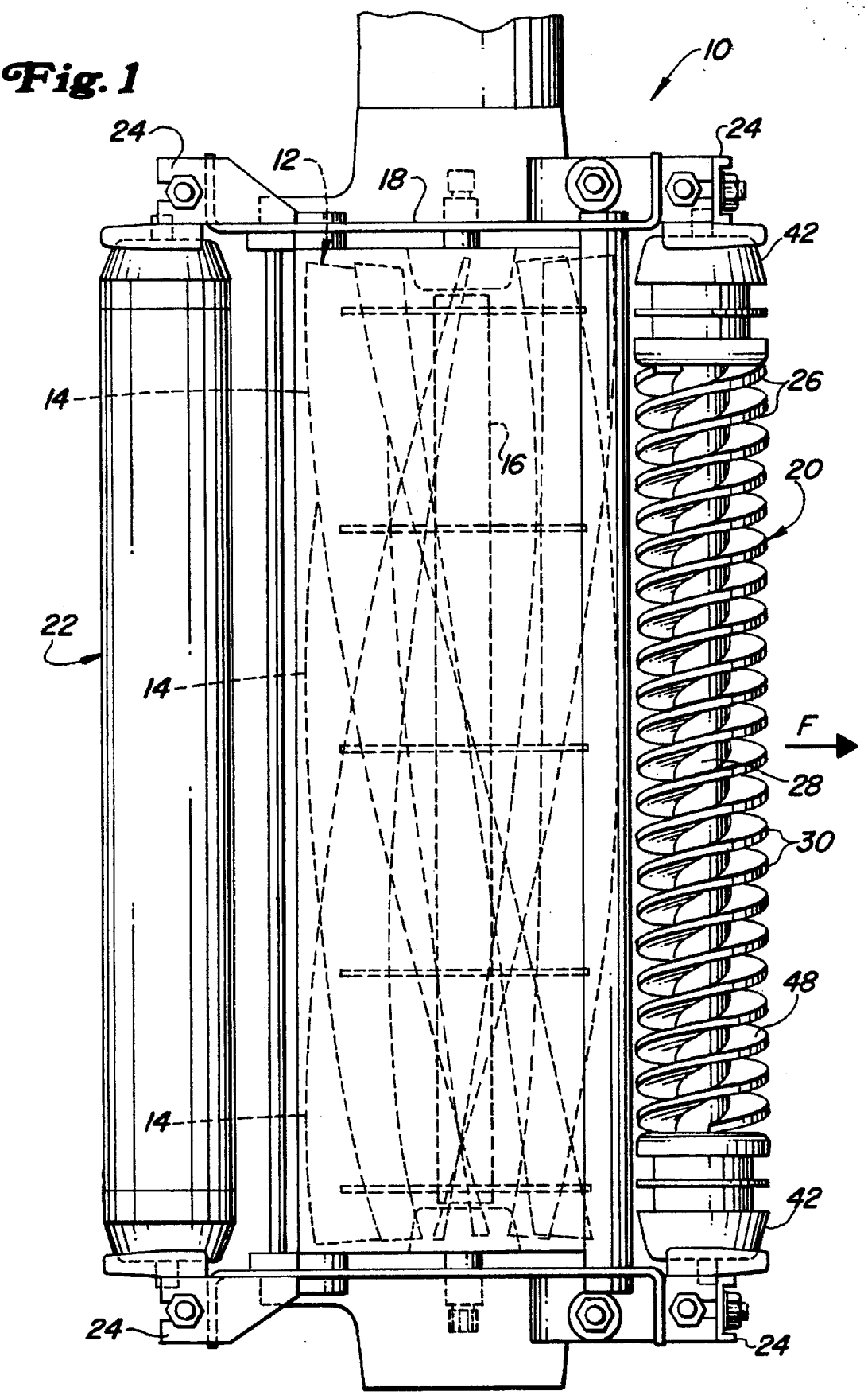
FIG. 1 is a plan view of a reel mower cutting unit having a spiral roller according to the preferred embodiment of the present invention mounted to the front of the cutting unit frame.
Figure 2:
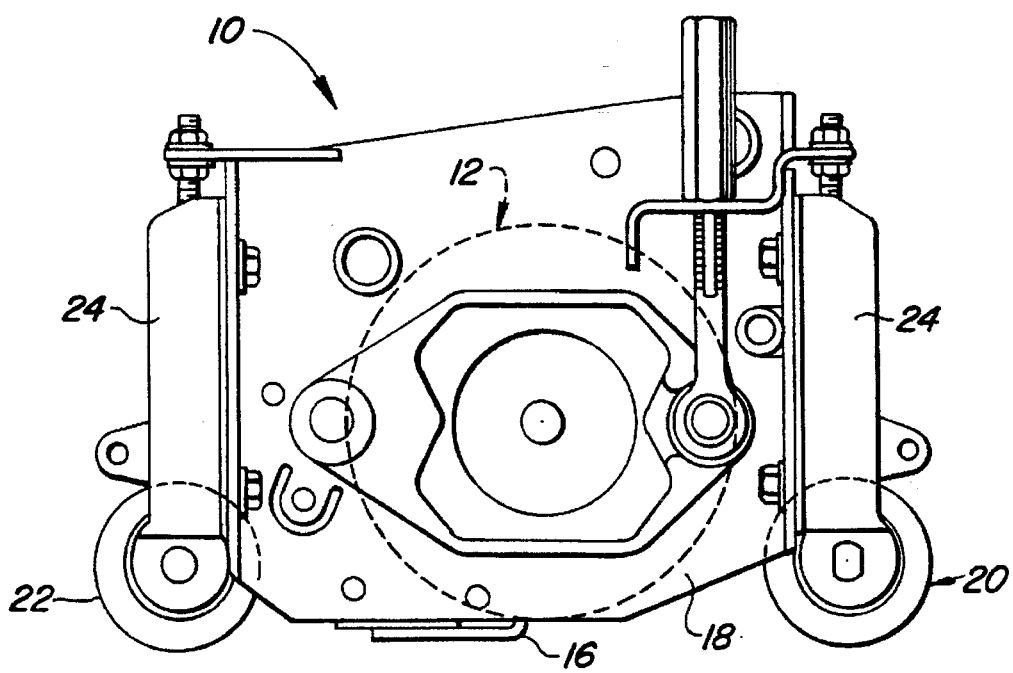
FIG. 2 is a side view of a reel mower cutting unit to which the present invention may be coupled.
Figure 3:
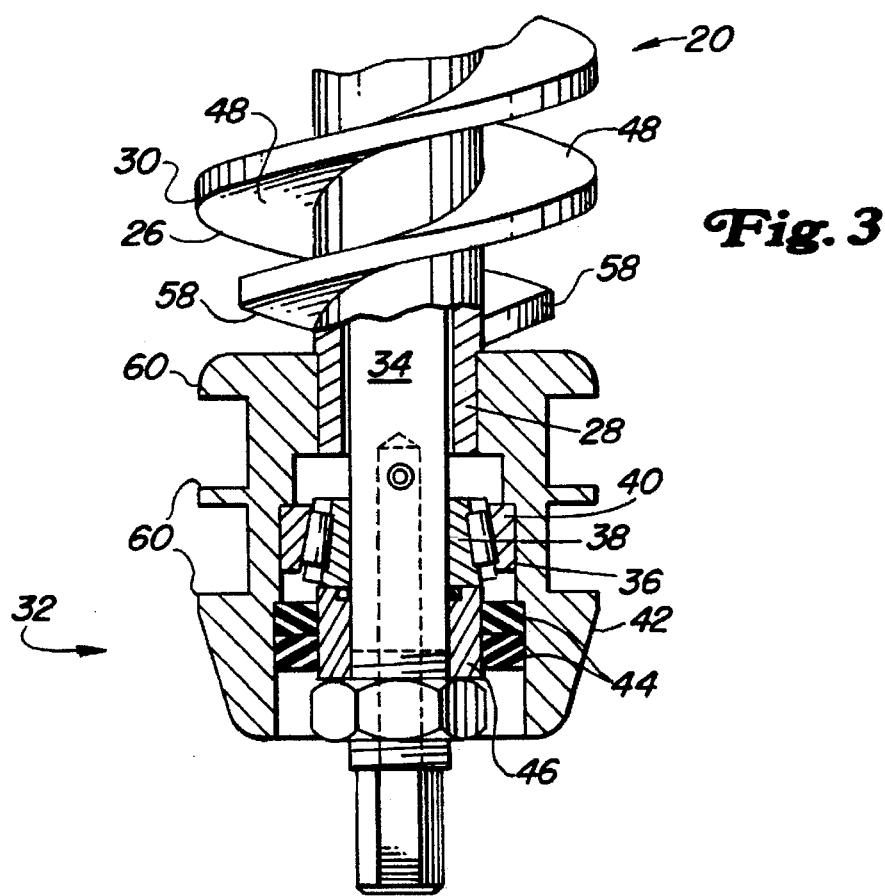
FIG. 3 is a sectional view of the bearing mechanism which supports the spiral roller mechanism according to the present invention.

Referring now to FIGS. 1–3, there is shown the preferred embodiment of the present invention. A cutting unit 10 is shown having a generally cylindrical cutting reel 12 rotatable about a laterally extending horizontal axis. The cutting reel 12 includes blades 14 which pass in close proximity to a bedknife 16, and thereby cut vegetation with a shearing action. The bedknife 16 and cutting reel 12 are supported within a rigid cutting unit frame 18. The cutting unit 10 is provided with front and rear rollers 20 and 22 which are supported by brackets 24 which are mounted to the cutting unit frame 18. The brackets 24 are adjustable vertically for raising and lowering the cutting unit frame 18 with respect to the rollers 20 and 22. The height at which grass is cut is thereby adjusted.

As seen in FIGS. 1 and 3, the front roller 20 according to the preferred embodiment of the present invention includes a pair of spiral members 26 which extend in a helical pattern. The structure of the spiral members 26 are somewhat similar to flights of an auger. The pair of spiral members 26 are welded to a central tube 28 which defines an axis of rotation about which the spiral members 26 rotate as radially outer edges 30 of the spiral members 26 contact the ground during operation.

Referring now to FIG. 3, there is shown a cross-sectional view of a bearing assembly 32 which couples the spiral roller 20 with the bracket 24. A shaft 34 extends laterally between the right and left front brackets 24. A bearing 36 is fixed on the shaft 34 and includes inner and outer races 38 and 40. The inner race 38 is fixed with the shaft 34, and the outer race 40 is fixed with an end cap 42. The tube 28 is rigidly coupled with and extends laterally between the right and left end caps 42. The spiral members 26 are welded to the tube 28. The shaft 34 remains fixed with the brackets 24 during forward travel, and the outer race 40, end cap 42 and tube 28 rotate about the axis defined by the shaft 34 as the spiral members 26 roll in contact with the ground. A pair of seals 44 are positioned between the end cap 42 and a bushing 46 mounted on the shaft 34. FIG. 3 also shows the end portions 58 of the spiral members 26. The end portions of the spiral members 26 are spaced from the end cap 42 and thereby define a gap through which grass clippings may pass. This gap generally prevents clippings or other debris from being captured and accumulating between the spiral members 26 and the end cap 42.

Next, the operation of the preferred embodiment will be discussed. During operation the radially outer edges 30 of the spirals 26 contact the ground and generally support the cutting unit 10 above the ground. As the cutting unit 10 travels forwardly, the spirals 26 roll in contact with the ground and rotate about the axis defined by the shaft 34. As obstructions such as small clumps of sand, dirt or grass clippings are encountered by the forwardly rolling spirals 26, the obstruction will tend to be directed into the space between the spirals 26, and therefore the outer edges 30 of spirals 26 remain in firm contact with the ground surface. Therefore, the front of the cutting unit 10 is generally prevented from bobbing up as the front roller 20 encounters small obstructions, since the obstructions tend to pass through the gaps defined between the spirals 26. Cut quality is therefore enhanced. Debris encountered by the roller 20 does not tend to accumulate on the outer edges 30 of the spirals 26. Therefore, the effective diameter of the roller 20 tends to remain constant. It has been found that any debris which may accumulate on the generally vertically extending sides 48 of the spiral members 26 tends to be wiped from the spiral 26 as the radially outer edge 30 of the spiral members 26 contact the ground. Therefore, the spiral roller member 20 according to the preferred embodiment tends to be generally self-cleaning.

Since the spiral roller 20 of the present invention is generally self-cleaning, the need for an additional roller scraper mechanism is generally eliminated. The cost to produce the cutting unit 10 is correspondingly reduced by the absence of a roller scraper. The absence of a scraper allows the roller 20 to be positioned in close proximity to the cutting reel 12, thereby enhancing the cutting unit's ability to follow ground undulations. The weight of the cutting unit 10 is also reduced by the absence of a roller scraper. Light cutting units are generally advantageous because they compact the soil less, thereby promoting healthy turf growth. Furthermore, the spiral roller mechanism 20 according to the preferred embodiment is relatively light and weighs less than conventional grooved rollers having stacked washers and spacers. Compaction of the soil beneath the cutting unit 10 according to the present invention is therefore minimized.

When the spiral roller 20 according to the present invention is utilized at the front of a reel mower cutting unit and a smooth roller is used at the rear of the cutting unit, as shown in FIG. 1, relatively few marks or grooves are left in the turf surface. The outer edges 30 of the spiral member 26 tend to make less of an impression in the ground surface than the washers of conventional grooved rollers. Therefore, the appearance of the freshly mowed area is generally enhanced.

Figure 4:
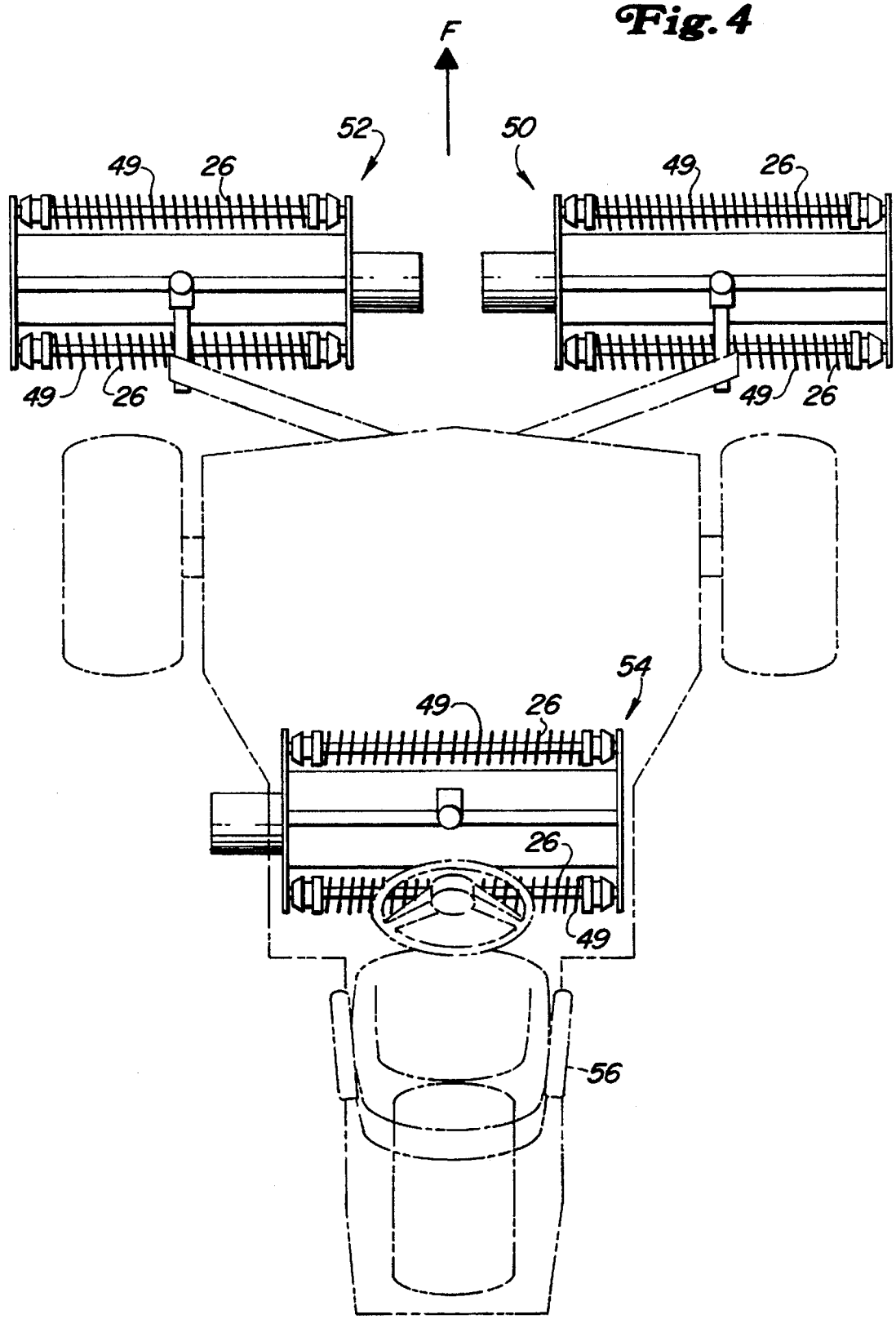
FIG. 4 is a schematic plan view of a vehicle having a plurality of reel mower cutting units mounted thereto, wherein the cutting units have front and rear spiral rollers according to an alternative embodiment of the present invention adapted for creating a striped effect on the mowed turf.

Referring now to FIG. 4, there is shown an alternative embodiment of the present invention. FIG. 4 shows spiral rollers 49 mounted to both the front and rear portions of cutting units 50, 52 and 54. The cutting units 50, 52 and 54 are positioned laterally with respect to one another for mowing a relatively large width of turf with a single pass of the vehicle 56. As the cutting units 50, 52 and 54 move forward during operation, the spiral rollers 49 mounted at the front of the cutting units 50, 52 and 54 tend to leave small impressions or indentations where the outer edges 30 of the spirals 26 press against the ground. Spiral rollers 49 coupled to the rear of each cutting unit 50, 52 and 54 create additional impressions in the turf surface. The impressions tend to remain in the surface of the turf since no smooth roller is mounted to the rear of the cutting unit for levelling or smoothing the ground surface.

The right front cutting unit 50 and the rear cutting unit 54 are laterally offset from one another so as to pass over and mow adjacent strips of ground. The cutting units as shown in FIG. 4 which pass over adjacent strips of turf have helical members 26 which spiral around the central axis of the roller 49 in opposite directions. For example, the spiral members 26 of the right front cutting unit 50 spiral in a direction opposite to that of the spiral members 26 on the rear cutting unit 54. The spiral members 26 of the front right cutting unit 50 are angled to the left as seen in FIG. 4, whereas the spiral members 26 of the rear cutting unit 54 angle to the right in FIG. 4. Angling the spiral members in this manner causes different impressions to be made on adjacent strips of turf. Adjacent strips of turf can be differentiated from each other by the naked eye due to the different impressions on adjacent strips. The strips of turf define stripes which result from use of the spiral rollers 49 in the configuration described above.

FIG. 3 shows protruding portions 60 which extend radially outwardly from the end cap 42. Spaces or gaps are defined between the protruding portions 60. The protruding portions 60 function in a manner similar to the washers of a conventional grooved roller, and roll in contact with the turf. An end cap could also be provided having spiral members coupled therewith according to the present invention instead of the protruding portions as shown in FIG. 3.

The present invention as described above includes spiral members 26 which extend in a helix around the tube 28 in a single direction the entire width of each tube 28. However, rollers could also be provided within the spirit of the present invention having spiral members extending around a tube 28 in different directions on different portions of the tube 28. For example, the left half of the roller could have spiral members which wind around the tube 28 in a first direction, and the right half of the roller could have spiral members which wind around the tube 28 in the direction opposite to that of the left half.

I claim:

1. A roller coupled with a reel mower cutting unit for contacting the ground and supporting the cutting unit above the ground for establishing the height at which vegetation is cut, said roller comprising:

at least one spiral roller member having radially outer edge portions which contact the ground during operation for supporting the cutting unit above the ground, said ground contacting outer edge portions being spaced from each other to define spaces therebetween, said spiral roller member being rotatable about a laterally extending axis as the radially outer edge portions of the spiral roller member contact the surface of the ground during operation.

2. The invention of claim 1, wherein portions of the outer edge portions contact the ground simultaneously and are spaced from each other to define spaces therebetween.

3. The invention of claim 1, and further comprising:

a laterally extending tube member to which the spiral roller member is fixed, said tube member is rotatable about the laterally extending axis.

4. The invention of claim 1, wherein the cutting unit includes a cutting reel and a bedknife which cut vegetation with a shearing action.

5. The invention of claim 4, wherein a plurality of said cutting units are coupled with a vehicle for traveling over adjacent strips of turf, and the spiral roller members which roll across adjacent strips of turf spiral around their respective axes in opposite directions.

6. The invention of claim 5, wherein each cutting unit includes front and rear rollers, both of which include at least one spiral roller member.

7. The invention of claim 1, wherein said roller includes a pair of spiral roller members which rotate in contact with the ground.

8. The invention of claim 1, wherein said spiral roller member is mounted to the front portion of the cutting unit, and a smooth roller is mounted to the rear portion of the cutting unit.

9. The invention of claim 1, wherein one of said spiral roller members is coupled to the front portion of the cutting unit, and one of said spiral roller members is coupled to the rear portion of said cutting unit.

10. A cutting unit roller adapted to roll in contact with the ground for supporting the cutting unit above the ground, said roller comprising:

at least one spiral roller member extending radially outwardly from a laterally extending axis, said spiral roller member extends in a spiral around the axis, and includes radially outer edge portions which roll in contact with the surface of the ground during operation of the cutting unit, and laterally adjacent edge portions are laterally spaced from one another.

11. The invention of claim 10, wherein the cutting unit includes a cutting reel positioned behind the spiral roller member for cutting vegetation.

12. The invention of claim 10, wherein a plurality of said cutting units are coupled with a vehicle for travelling over adjacent strips of turf during operation, and the spiral roller members of cutting units travelling over adjacent strips of turf spiral around their respective axes in opposite directions.

13. A roller coupled with a reel mower cutting unit, said cutting unit having a cutting reel and a bedknife which cut vegetation with a shearing action, wherein said roller contacts the ground for supporting the cutting unit above the ground and for establishing the height at which vegetation is cut, said roller comprising:
- a laterally extending tube member coupled with the cutting unit for rotation about a laterally extending axis,
- at least one spiral roller member coupled with the laterally extending tube member, said spiral roller member having radially outer edge portions which contact the ground simultaneously during operation for supporting the cutting unit above the ground, said portions which contact the ground are spaced from each other to define spaces therebetween, said spiral roller member being rotatable about the laterally extending axis as the radially outer edge portions of the spiral roller member contact the surface of the ground during operation.

* * * * *